United States Patent [19]
Boyle

[11] 3,878,595
[45] Apr. 22, 1975

[54] HOLE LOCATOR FOR AUTOMATIC RIVETING MACHINES

[75] Inventor: Frank A. Boyle, San Diego, Calif.

[73] Assignee: General Dynamics Corporation, San Diego, Calif.

[22] Filed: Mar. 22, 1974

[21] Appl. No.: 453,744

[52] U.S. Cl. .............. 29/200 P; 29/208 C; 408/13; 408/79
[51] Int. Cl. .................... B23P 19/00; B23P 19/04; B23P 11/00
[58] Field of Search ......... 29/200 P, 208 C, 243.53; 217/15; 408/13, 16, 75, 79, 115, 12

[56] References Cited
UNITED STATES PATENTS

| | | | |
|---|---|---|---|
| 488,643 | 12/1892 | Wiggins | 408/75 |
| 1,290,789 | 1/1919 | Schendel | 408/16 |
| 2,417,681 | 3/1947 | Frank | 29/243.53 |
| 2,435,256 | 2/1948 | Whitmore | 408/115 |
| 2,847,881 | 8/1958 | Allemann | 408/79 |
| 3,166,758 | 1/1965 | Jensen | 227/15 |

*Primary Examiner*—Thomas H. Eager
*Attorney, Agent, or Firm*—John R. Duncan

[57] ABSTRACT

A device for locating a pilot hole and aligning it with the operating mechanism of an automatic riveting machine is disclosed. Automatic riveting machines typically position a pilot hole in the workpiece to be riveted, drill an appropriate hole, countersink one or both external surfaces, insert a rivet, then press to deform the rivet. The disclosed hole locator includes a pin movable into alignment with the metal working axis, which is the line along which the drilling, countersinking, rivet pressing, etc., tools move. The pin is moved into the pilot hole to align the pilot hole with the riveting machine. The machine is operated to clamp the workpiece with the pin still in position. Then the pin is withdrawn and the riveting cycle completed. This hole locator can also be advantageously used with drill presses or other similar devices.

5 Claims, 4 Drawing Figures

HOLE LOCATOR FOR AUTOMATIC RIVETING MACHINES

BACKGROUND OF THE INVENTION

This invention relates to an accessory for riveting and drilling machines which permits accurate location and alignment of pre-drilled pilot holes.

Automatic riveting machines have come into widespread use in aircraft and other applications in which a large number of rivets must be precisely located and employed. Typical machines of this type include Craco riveting machines available from the C. R. Alford Co. In such a machine, a pilot hole is located approximately on the machine operating centerline by moving the sheets or other workpiece to be riveted. Once the pilot hole is located, a foot pedal or other control is activated, starting an automatic machine sequence during which the sheets to be riveted are clamped, the rivet hole is drilled and countersunk, a rivet is inserted and the rivet is squeezed between upper and lower anvils. The machine may have a small lamp, projecting a spot of light onto the workpiece at the centerline. However, the light is easily vibrated out of adjustment, or the pilot hole may not be aligned with the light spot due to an operator error. This results in offcenter drilling of the rivet hole, and an inspection rejection. This is costly and time consuming because of the rework or replacement which is often necessary.

Similarly, with drill presses it is often necessary to drill larger holes in exact alignment with pre-drilled pilot holes. Merely aligning the drill with the pilot hole by eye often results in distorted, off-center holes and may result in drill breakage.

Thus, there is a continuing need for improved methods and fixtures for accurate drilling of holes in automatic riveting machines, drill presses, etc.

SUMMARY OF THE INVENTION

It is, therefore, an object of this invention to provide a hole locating system overcoming the above-listed problems.

Another object of this invention is to provide a device permitting rapid and accurate alignment of pilot holes in machine tools.

The above objects and others are accomplished in accordance with this invention by a device in which a locating pin is resiliently biased against a workpiece surface so that the pin drops into a pilot hole to align the hole with the machine metal working axis, e.g., the axis of a drill or other tool. Once the pin enters the hole, the workpiece is clamped in position, the pin is pivoted away and the drilling, riveting or other operation takes place.

DETAILED DESCRIPTION OF THE INVENTION

Figure 1:
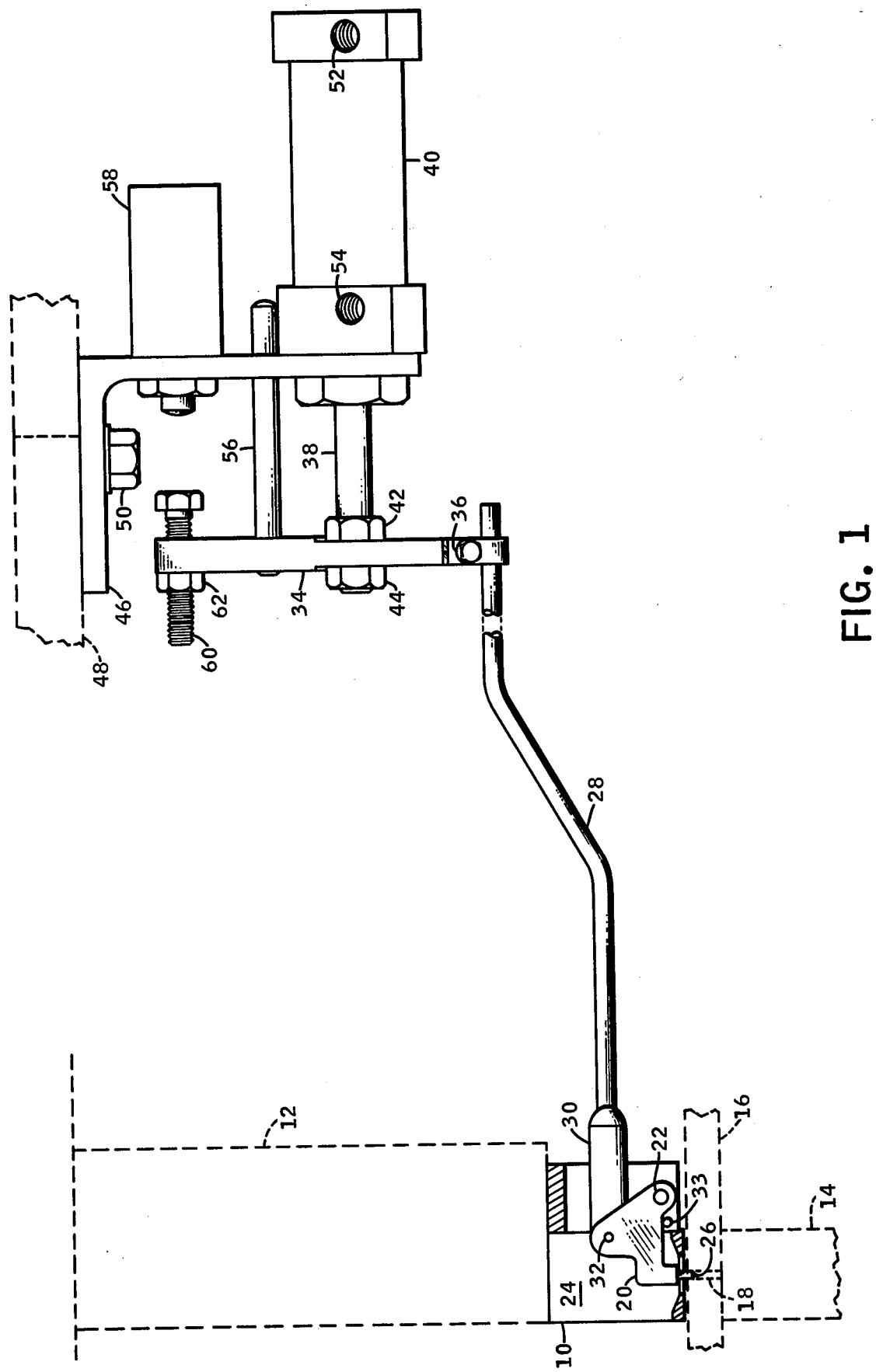
FIG. 1 is an elevational view of the hole locator in the locating position.

Referring now to FIG. 1, the hole locating and aligning device of this invention is seen in the hole locating position. The locating head 10 is secured to the upper clamping member or anvil 12 of a machine tool such as an automatic riveting machine. For clarity, parts of the machine on which the hole locating device may be mounted are shown in phantom. The lower clamping member 14 of the machine is spaced below head 10. Typical machines having this anvil arrangement include Craco riveters, available from the C. R. Alford Co., and various automatic riveting machines made by Gemcor Inc. Of course, other riveting machines, drill presses, etc., may have or be provided with this anvil arrangement.

The space between head 10 and lower anvil 14 is sufficient to permit a workpiece 16, typically a panel, set of sheets, etc., to be moved relative to the machine. This workpiece 16 will have a pre-drilled pilot hole 18 to guide drilling, riveting, etc. operations to take place in the machine. After workpiece 16 is precisely aligned, lower anvil 14 is raised to clamp the panel between head 10 and anvil 14, permitting a series of operations such as drilling, countersinking, riveting, etc., to take place without movement of workpiece 16.

Figure 3:
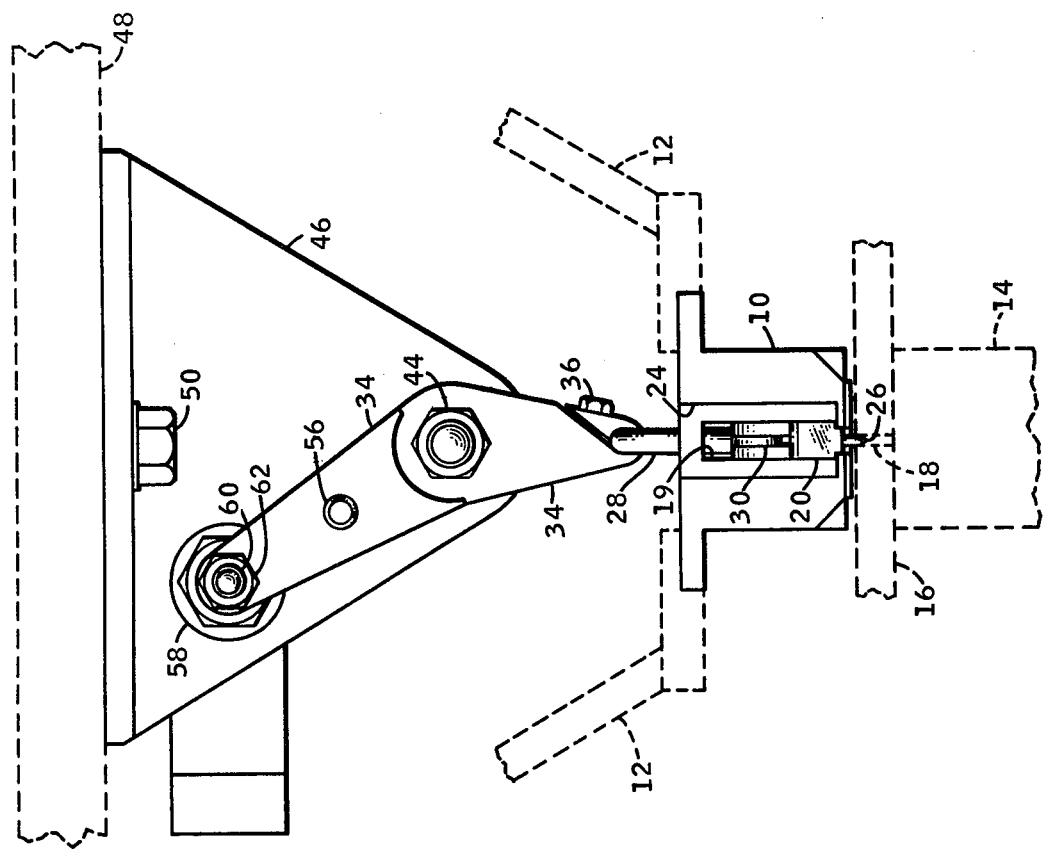
FIG. 3 is an end elevational view of the hole locator as seen in FIG. 1.

Head 10 has a generally cylindrical configuration, with the interior machined away to provide a slot 19 (as best seen in FIG. 3) within which bell crank 20 moves about pivot 22, and cavity 24 around the head vertical center-line to aid the operator in viewing the locating operation, and to permit drills or other tools to move downwardly through head 10 along that centerline or axis.

Bell crank 20 has a pin 26 at one end adapted to extend downwardly beyond the lower face of head 10. Pin 26 has a diameter equal to that of the hole to be located, and is located precisely on the metalworking axis, that is, the axis of the drill, countersink, rivet pressing means, etc. Pin 26 is preferably threaded into bell crank 20 so that it can be removed and replaced with pins of other diameters, to accommodate other pilot holes sizes. Bell crank 20 is rotated from the position shown in FIGS. 1 and 3 to that shown in FIG. 2 by moving push rod 28 to the right from the position shown in FIG. 1. Push rod 28 may be a solid rod with a machined thin flat end 30 or may be a tube with a flattened end 30. Pin 32 rotatably connects bell crank 20 to rod end 30. A stop pin 33 limits the downward movement of bell crank 20 to the position shown in FIG. 1.

Push rod 28 extends through a hole in bracket 34 and is clamped by cap screw 36. Loosening cap screw 36 permits adjustment of the position of rod 28. Bracket 34 is mounted at the threaded end of piston 38 of air cylinder 40 by a pair of jam nuts 42 and 44. Air cylinder 40 is secured to mounting bracket 46, which is secured to machine member 48 by bolt 50. Air cylinder 40 may be any suitable hydraulic or pneumatic cylinder, such as Model TSE "Tiny Tim" cylinder from Compressed Air Service Co. When compressed air enters port 52 of air cylinder 40, piston 38 moves to the position shown in FIG. 1, while when compressed air instead enters port 54, piston 38 moves to the position shown in FIG. 2. A guide pin 56, secured to bracket 34 and movable within a snug-fitting hole in mounting bracket 46, prevents rotation of bracket 34 around piston 38.

Figure 2:
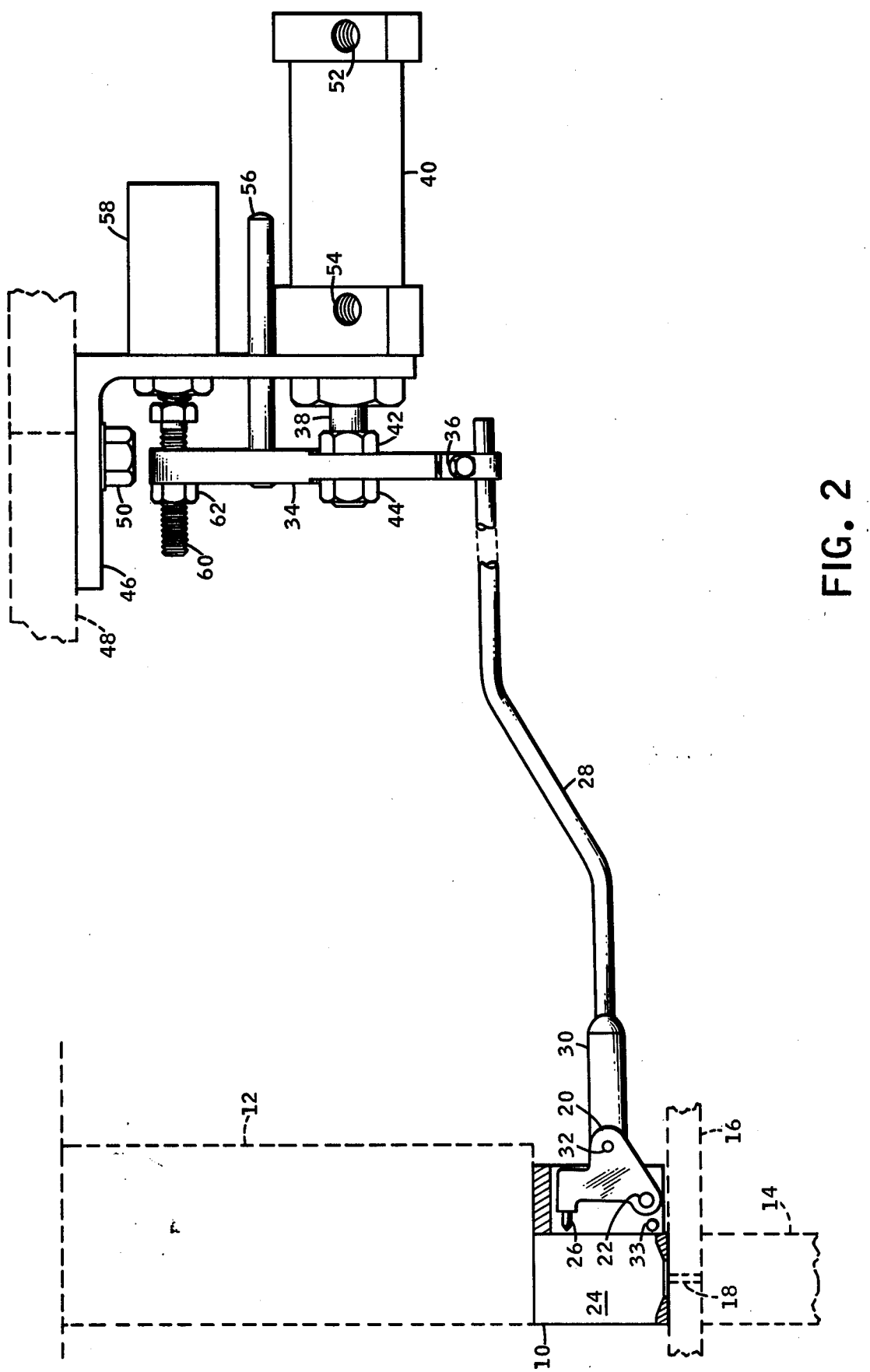
FIG. 2 is an elevational view showing the hole locator in the riveting position.

A microswitch 58 is mounted on bracket 56 and is adapted to be engaged (as seen in FIG. 2) by adjustable bolt 60 which passes through a threaded hole in bracket 34 and is secured in a selected position by jam nut 62. A typical microswitch 58 is a Type BZ E6-2RQ plunger switch.

Figure 4:
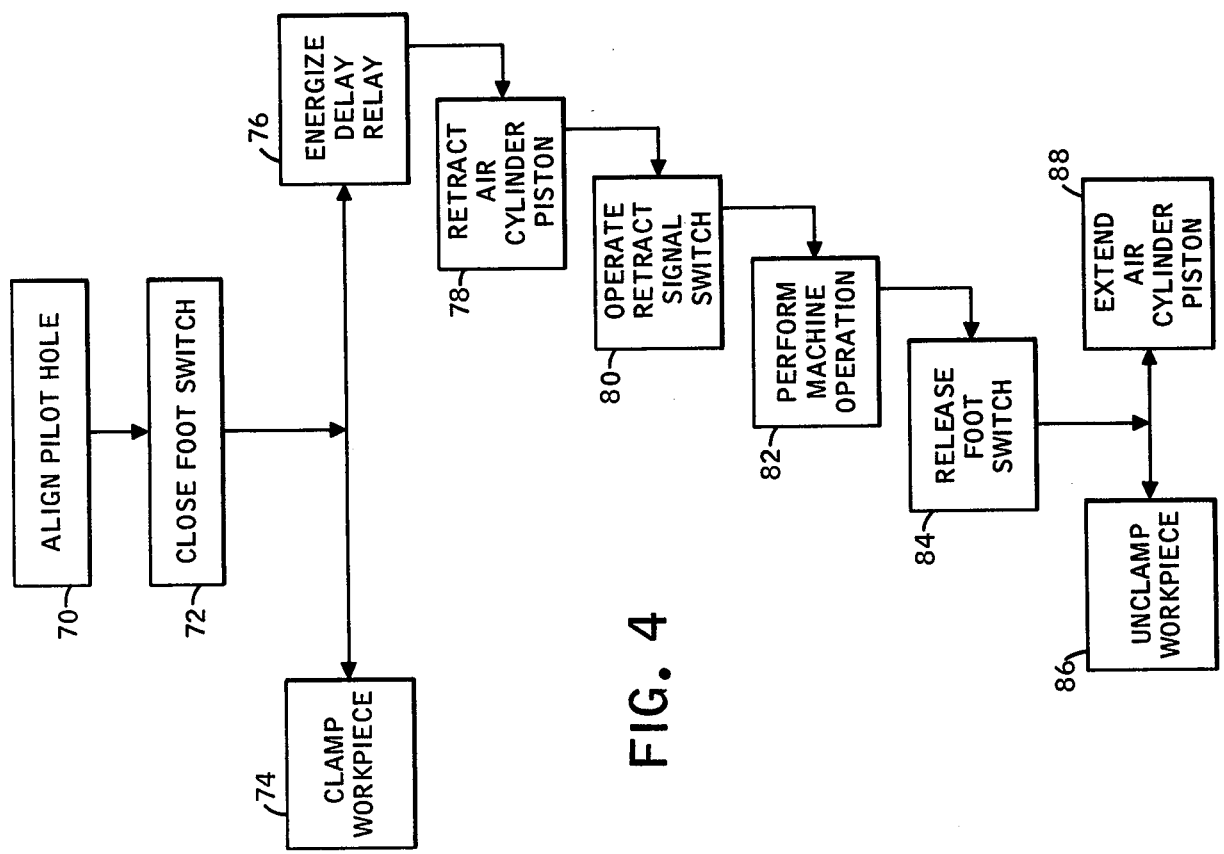
FIG. 4 is a block diagram illustrating the operation of the hole locator.

The operation of this device with a conventional riveting machine is schematically illustrated in FIG. 4.

With the device in the position shown in FIG. 1, the operator moves a workpiece 16 until pin 26 drops into pilot hole 18 (box 70). At this time, air under pressure is directed into port 52 of air cylinder 40. Pin 26 is biased downwardly against workpiece 16 and into pilot hole 18 by this air pressure and the resiliency of bent push rod 28.

When pin 26 enters pilot hole 18, the operator closes an electrical switch (box 72) (not shown), conveniently a foot-operated switch, energizing a circuit causing lower anvil 14 to rise and clamp workpiece 16 between anvil 14 and head 10 (box 74). A conventional delay relay or timer (not shown) is also energized (box 76). At the end of the selected delay, which permits the clamping operation to be completed, a conventional solenoid valve (not shown) is activated, switching air pressure from port 52 to port 54, causing piston 38 to retract (box 78), rotating bell crank 20. As piston 38 retracts, bolt 60 operates microswitch 58 (box 80) which starts the machine operation (box 82). Typically, conventional automatic rivet machine logic will sequentially lower a drill down from within upper anvil 12 through head 10 to drill a rivet hole, a rivet will be inserted in the hole and pressure feet will deform the rivet. Upon completion of the machine operations, the operator will release the foot switch (box 84), causing the lower anvil 14 to release the workpiece 16 (box 86) and causing air pressure to be returned to port 52, extending piston 38 (box 88). The operator moves the panel to align pin 26 with the next pilot hole and the above sequence of steps is repeated.

The details of the associated machine, its switches and circuitry, are not described in detail, since these are conventional components which will be selected by those skilled in the art for the particular machine with which the novel hole locating and aligning device is to be used.

Specific components and mechanical arrangements have been detailed in the above description of a preferred enbodiment. These may be varied and other components used, where suitable. Other variations, applications and ramifications of the invention will become apparent to those skilled in the art upon reading this disclosure. These are intended to be included within the scope of this invention, as defined in the appended claims.

I claim:

1. A pilot hole locating and aligning device which comprises:
   a head member adapted to be secured to an associated metalworking machine along a metalworking axis thereof;
   means permitting a workpiece having a pilot hole therethrough to be moved substantially parallel to one face of said head, across said metalworking axis;
   a bell crank located within said head;
   a pin having a diameter substantially equal to the diameter of the pilot hole to be aligned, mounted on one arm of said bell crank and adapted to extend past said one face into contact with a workpiece located adjacent to said one face and into said pilot hole when said pilot hole is aligned with said pin;
   connecting means attached to the other arm of said bell crank to rotate said bell crank, to move said pin between a first position extending beyond said one face and a second retracted position within said head wherein said bell crank is away from said metalworking axis;
   extendable and retractable means to move said connecting means substantially longitudinally to move said bell crank between said two positions; and
   electrical switch means activated when said bell crank reaches said second position to allow the associated metalworking machine to commence metalworking functions.

2. The device according to claim 1 wherein said connecting means comprises a bent push rod having substantially parallel but offset ends, wherein said pin is resiliently biased toward said workpiece.

3. The device according to claim 2 wherein said extendable and retractable means comprises an air cylinder.

4. The device according to claim 1 wherein said head is cut away along said metalworking axis to permit metalworking tools to be moved into and out of said head when said bell crank is in said second retracted position.

5. The device according to claim 1 further including stop means within said head limiting the extension of said pin past said one face when said bell crank is in said first position.

* * * * *